(12) United States Patent
Heilmann et al.

(10) Patent No.: US 6,996,462 B2
(45) Date of Patent: Feb. 7, 2006

(54) METHOD OF CONTROLLING AT LEAST ONE AUTONOMOUSLY DRIVING VEHICLE

(75) Inventors: Harro Heilmann, Ostfildern (DE);
Rainer Konzmann, Ammerbuch (DE);
Andreas Schwarzhaupt, Oberrot (DE);
Gernot Spiegelberg, Heimsheim (DE);
Armin Sulzmann, Oftersheim (DE);
Christof M. Weber, Gechingen (DE)

(73) Assignee: DaimlerChrysler AG, Stuttgart (DE)

(*) Notice: Subject to any disclaimer, the term of this patent is extended or adjusted under 35 U.S.C. 154(b) by 67 days.

(21) Appl. No.: 10/738,133

(22) Filed: Dec. 18, 2003

(65) Prior Publication Data

US 2004/0199306 A1    Oct. 7, 2004

(30) Foreign Application Priority Data

Dec. 18, 2002  (DE)  ............................. 102 59 168

(51) Int. Cl.
G05D 1/00    (2006.01)
G01C 21/00   (2006.01)
(52) U.S. Cl. ........................ 701/24; 701/117
(58) Field of Classification Search ................ 701/24, 701/25, 23, 117, 301, 2; 342/357.09; 318/580, 318/581, 587
See application file for complete search history.

(56) References Cited

U.S. PATENT DOCUMENTS

| | | | |
|---|---|---|---|
| 6,038,502 A | * | 3/2000 | Sudo ........................... 701/23 |
| 6,061,613 A | * | 5/2000 | Zyburt et al. ................. 701/24 |
| 6,141,620 A | * | 10/2000 | Zyburt et al. ............... 701/117 |
| 6,173,222 B1 | | 1/2001 | Seo et al. ..................... 701/41 |
| 6,226,572 B1 | * | 5/2001 | Tojima et al. ................ 701/23 |
| 6,625,540 B2 | * | 9/2003 | Kageyama .................. 701/301 |
| 6,799,100 B2 | * | 9/2004 | Burns et al. .................. 701/25 |

FOREIGN PATENT DOCUMENTS

DE     39 12 353 A1     11/1989
DE    198 46 664 A1      4/1999

* cited by examiner

*Primary Examiner*—Michael J. Zanelli
(74) *Attorney, Agent, or Firm*—Crowell & Moring LLP

(57) ABSTRACT

In a method of controlling at least one autonomously driven vehicle, such a vehicle is driven on a restricted traffic surface. For this purpose, the autonomous vehicle has a driving device for implementing driving commands on the basis of fed signals. The driving commands relate to the driving direction as well as to the driving speed. The vehicle detects its actual position by means of a position indicating device, and transmits its position to an operations management center. In the operations management center, a route profile to be driven is determined from position signals by means of definable criteria and is transmitted to the driving device of the vehicle. Driving commands required for driving the route profile are generated in the vehicle by the driving device.

5 Claims, 1 Drawing Sheet

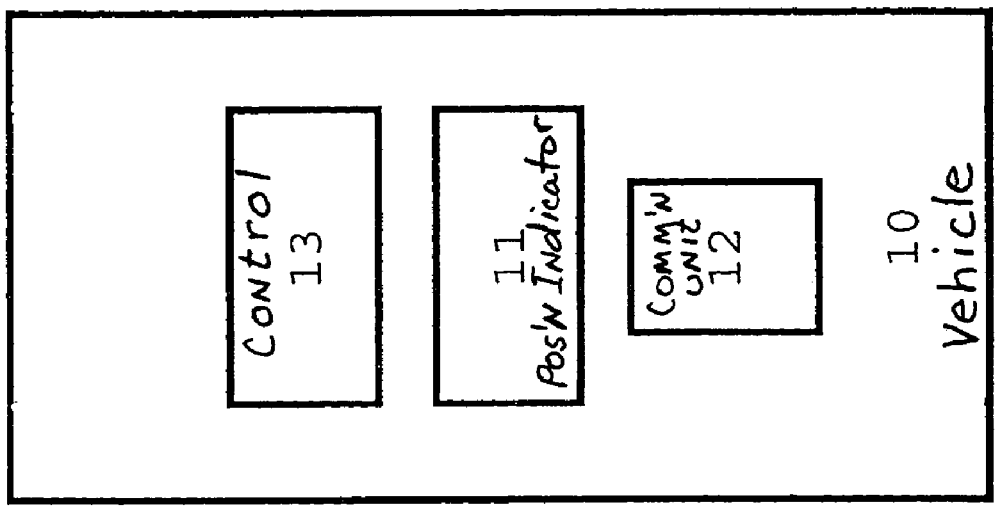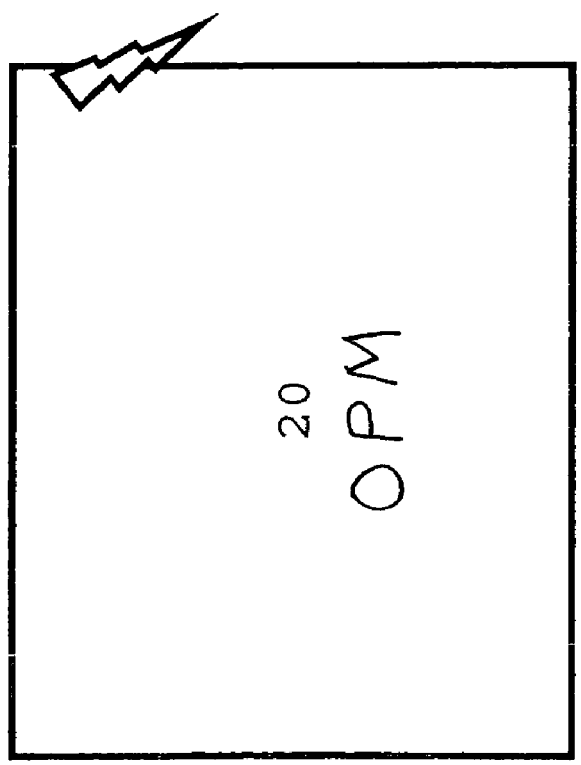

METHOD OF CONTROLLING AT LEAST ONE AUTONOMOUSLY DRIVING VEHICLE

BACKGROUND AND SUMMARY OF THE INVENTION

This application claims the priority of 10259168.7, filed Dec. 18, 2002, the disclosure of which is expressly incorporated by reference herein.

The invention relates to a method of controlling at least one autonomously operated vehicle.

Autonomously operated vehicles are known, for example, from German Patent Documents DE 39 12 353 A1 and DE 198 46 664 A1. In such vehicles, driving commands relating to the driving speed and direction are generated as a function of detected signals. On the basis of the driving commands, various adjusting devices in the vehicle are controlled which operate the drive system and the steering of the vehicle.

Vehicles are moved on traffic surfaces. Closed traffic surfaces in this case are traffic surfaces which ensure by their design that only known vehicles which meet certain characteristics are permitted to operate thereon. Examples of closed traffic surfaces are test and try-out tracks and race tracks, but the term also includes roads on which all entering vehicles can be checked with respect to certain characteristics.

When trying out vehicles (including development-stage vehicles) and components of vehicles, driving tests are required. A number of these driving tests are carried out on test and try-out surfaces. The driving tests partly require the driving of long driving distances and, on the other hand, also the driving on so-called rugged test tracks. The driving of long driving distances is tiring for the test driver; it is also monotonous work with little diversion. This results in increased driver fatigue and thus in a rise of the risk of accidents.

Driving long distances within as brief a time period as possible requires driving by several drivers in shifts, which is personnel-intensive. Driving on so-called rough tracks with an uneven roadway, which has the purpose of causing a time-reduced vibration-fatigue of the vehicle, results in corresponding undesirable physical stress to the driver. Although this can be reduced by means of special driver seats, the driver still has to withstand very long distances within a short time with high stress to the vehicle and the driver's body.

It is another problem that, although test drivers may try to produce defined driving test sequences as precisely as possible, this is not always observed in a clean and reproducible manner.

By using autonomously driven vehicles, the requirement to guide the vehicle by a driver for implementing such test drives is eliminated.

It is therefore an object of the invention to permit the autonomous driving of a vehicle within a restricted traffic space.

This and other objects and advantages are achieved by the method according to the invention, which at least one autonomously driven vehicle is operated on a restricted traffic surface. For this purpose, the autonomous vehicle has a driving device for implementing drive commands relating to driving direction and speed, on the basis of fed signals. The vehicle detects its actual position by means of a position indicating device, and position information is transmitted to an operations management center. Using definable criteria, the operations management center determines a route profile to be driven from the position signals and transmits it to the driving device of the vehicle, for example, by radio. In the case of fixed driving routes, a transmission is also conceivable by way of a line wire or a transponder.

In the vehicle, the driving commands required for the driving of the route profile are then generated by the driving device. If the vehicle is a tractor-trailer combination, a trailer control unit is additionally provided for determining the articulation angle and/or the drawbar angle of the trailer. The generation of the driving commands required for the driving of the route profile will then take place while additionally taking into account the determined articulation angle and/or drawbar angle.

As a result of this approach, it is permitted to guide at least one vehicle on a closed-off traffic surface. In this case, the driven route profile can be defined in the operations management center. The presence of a driver in the vehicle is no longer necessary. As a result of the fact that the vehicle continuously transmits its position to the operations management center, the correct driving of the route profiles can be monitored there.

According to a preferred further development of the invention, the route profile transmitted to the autonomous vehicle contains information relating to the route to be driven as well as concerning the driving speed. As a result of this approach, movement of the vehicle can be controlled as a function of defined test profiles, and adapted to external conditions, such as dryness, wetness and slippery ice.

According to another preferred embodiment of the invention, the driving device of the autonomous vehicle stores the course of the drivable routes of the restricted traffic surface. The route profile contains the indication of a segment of the drivable routes within the traffic surface as well as the driving speed to be maintained in this segment. This measure permits a reduction of the information to be transmitted to the vehicle. The drivable routes, in particular, reflect the course of the roadways or driving paths in the area of the traffic surface. The segments of the drivable routes indicate sections thereof which extend particularly from one point of intersection to the next. The course of the drivable route within the segment is known to the vehicle and does not have to be transmitted to it. The control of the movement will then take place by the autonomous vehicle in an automatic manner such that it does not leave the drivable route. The speed at which the route is driven is defined by the management center.

In a further embodiment of the invention, the route profile of a vehicle is determined as a function of the positions and route profiles of other autonomously driven vehicles on the traffic surface, so that several autonomous vehicles can be driven simultaneously on the traffic surface. The vehicles travel simultaneously, their route profiles being influenced by the management center so that a collision between the vehicles is avoided without requirement of separate devices in the vehicle.

According to a preferred embodiment of the invention, the route profile is determined as a function of driving profiles defined for the vehicle, so that the autonomously driven vehicles drive the routes according to defined driving profiles, and reproducible results are produced. The results also become mutually comparable between two measurements.

According to a further embodiment of the invention, non-autonomously driven vehicles may be operated on the traffic surface. The non-autonomously driven vehicles have position indicating devices, and transmit at least their actual position to the operations management center. The determination of the route profile of autonomously driven vehicles takes place as a function of the position of the non-autonomously driven vehicles. From the sequence of position reports of non-autonomously driven vehicles, their speed can also be read. This measure permits the maintenance of a non-autonomous driving operation simultaneously with the autonomous driving operation. Specifically for drivers' tests on test tracks, it is important for some driving tests that they be carried out by drivers who can also provide a subjective assessment of the vehicle handling. It is not sufficient to implement only autonomously implemented driving tests. In this case, a simultaneous implementation of driving tests controlled by the driver and autonomous driving tests is advantageous. A correspondingly high-expenditure time program or the providing of two separate test tracks is unnecessary.

In addition, driving commands or warnings with respect to other vehicles driving autonomously or non-autonomously on traffic surface or possible priorities, such as right-of-ways to be granted, can be displayed to the operator of a non-autonomously driven vehicle on a display in the vehicle. If a projection onto the interior side of the windshield of the vehicle or a head-up display is used for this purpose, it is also possible to project virtual roadway markings and/or guiding arrows. In this manner, it is possible to define to the driver of a non-autonomously driving vehicle a certain driving route and/or a certain load collective, which are computed and displayed in real time and/or are adapted corresponding to the momentary demands, for example, for the implementation of an obstacle avoidance maneuver in the event of a threatening collision with another vehicle driving on the traffic surface.

According to further preferred embodiments, the determination of the route profiles of autonomously driven vehicle takes place in accordance with an accident-free operating of the vehicles on the traffic surface. The criterion of an accident-free driving is placed, in particular, next to the criterion of driving certain test sequences and the reproduction of the same load profiles. Certain buffers, buffer routes and speed ranges in the speed definition permit guidance of the vehicles in an accident-free manner, simultaneously in the area of the traffic space.

A system according to the invention consists of a traffic surface with an operations management center assigned to the traffic surface, in which case autonomously driving and non-autonomously driving vehicles operate on the traffic surface. All vehicles have at least one position indicating device which is used for transmitting the position to the operations management center. Autonomously driven vehicles also have devices which permit autonomous operation on the basis of a defined route profile to be driven. According to the invention, it is provided that the operations management center determines the route profiles.

Other objects, advantages and novel features of the present invention will become apparent from the following detailed description of the invention when considered in conjunction with the accompanying drawings.

BRIEF DESCRIPTION OF THE DRAWINGS

The single FIGURE is a schematic view of an autonomously controlled vehicle which drives on the traffic surface.

DETAILED DESCRIPTION OF THE DRAWINGS

The vehicle 10 has a position indicating device 11 (such as, for example, a GPS-receiver or a so-called differential GPS-receiver), which determines its actual position. By means of the transmitter 12, the position of the vehicle 10 is then transmitted to the operations management center 20. In the operations management center 20, a route profile for the vehicle 10 is determined as a function of defined profiles to be driven and of the positions of the other vehicles on the traffic surface, and this route profile is then transmitted to the vehicle 10. The route profile contains information concerning the route to be driven as well as the driving speed to be driven on the route. According to definitions by the driving devices 13 (for example, actuators for the drive, the transmission, the brake system and the steering system), control signals for driving through the route profile are generated in the vehicle 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Method of controlling at least one autonomously driven vehicle on a restricted traffic surface, the autonomous vehicle having a driving device for implementing driving commands relating to driving direction and driving speed, on the basis of fed signals, said method comprising:

the vehicle determining its actual position by means of a position indicating device;

the vehicle transmitting position signals identifying its position to an operations management center;

the operations management center determining a route profile to be driven by the vehicle, based on the position signals, using definable criteria;

the operations management center transmitting said route profile to the driving device of the vehicle; and the driving device generating driving commands for driving the route profile; wherein, the route profile contains information defining a driving route and a driving speed to be followed by the vehicle; and the route profile of the vehicle is determined as a function of positions and route profiles of other vehicles autonomously driving on the traffic surface, such that collisions between said vehicles are avoided.

2. The method according to claim 1, wherein:

courses of drivable routes of the restricted traffic surface are defined by reference to route segments which extend from one point of intersection to a next point of intersection, for respective drivable routes;

information defining the course of respective route segments is stored in the driving device; and the route profile defines the route to be followed by the vehicle by reference to segments of the traffic surface as well as the driving speed to be observed in said segments.

3. The method according to claim 1, wherein the route profile is determined as a function of driving profiles defined for the vehicle.

4. The method according to claim 1, wherein:

non-autonomously driven vehicles operate on the traffic surface;

the non-autonomously driven vehicles have position indicating devices and transmit at least their actual position to the operations management center; and the route profile of the autonomously driven vehicle is defined as a function of position of non-autonomously driven vehicles.

5. The method according to claim 1, wherein route profiles for the autonomously driven vehicle are determined in accordance with an accident-free operating of the vehicles on the traffic surface.

* * * * *